(12) United States Patent
Praisner et al.

(10) Patent No.: US 9,926,806 B2
(45) Date of Patent: Mar. 27, 2018

(54) TURBOMACHINE FLOW PATH HAVING CIRCUMFERENTIALLY VARYING OUTER PERIPHERY

(71) Applicant: United Technologies Corporation, Hartford, CT (US)

(72) Inventors: Thomas J. Praisner, Colchester, CT (US); Eric A. Grover, Tolland, CT (US); Renee J. Jurek, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 397 days.

(21) Appl. No.: 14/598,822

(22) Filed: Jan. 16, 2015

(65) Prior Publication Data
US 2016/0208643 A1 Jul. 21, 2016

(51) Int. Cl.

| F01D 5/14 | (2006.01) |
|---|---|
| F01D 25/06 | (2006.01) |
| F01D 9/04 | (2006.01) |
| F01D 5/12 | (2006.01) |
| F01D 25/24 | (2006.01) |
| F04D 29/52 | (2006.01) |

(Continued)

(52) U.S. Cl.
CPC ............... *F01D 25/06* (2013.01); *F01D 5/12* (2013.01); *F01D 5/143* (2013.01); *F01D 9/041* (2013.01); *F01D 25/24* (2013.01); *F01D 5/145* (2013.01); *F04D 27/02* (2013.01); *F04D 27/0207* (2013.01); *F04D 29/526* (2013.01); *F04D 29/547* (2013.01); *F04D 29/685* (2013.01); *F05D 2220/32* (2013.01); *F05D 2240/12* (2013.01); *F05D 2240/24* (2013.01); *F05D 2250/70* (2013.01); *F05D 2260/941* (2013.01); *F05D 2260/96* (2013.01); *Y02T 50/673* (2013.01)

(58) Field of Classification Search
CPC .......... F01D 5/143; F01D 5/145; F01D 25/06; F01D 25/24; F01D 5/12; F01D 9/041; F04D 29/526; F04D 29/547; F04D 29/685; F04D 27/02; F04D 27/0207
See application file for complete search history.

(56) References Cited

U.S. PATENT DOCUMENTS

| 5,397,215 A | 3/1995 | Spear et al. |
| 5,573,952 A | 11/1996 | Moessner |

(Continued)

FOREIGN PATENT DOCUMENTS

| EP | 2484871 | 8/2012 |
| GB | 2408546 | 6/2005 |

OTHER PUBLICATIONS

Extended European Search Report for European Application No. 16151261.1 dated Jun. 14, 2016.

*Primary Examiner* — Woody Lee, Jr.
*Assistant Examiner* — Behnoush Haghighian
(74) *Attorney, Agent, or Firm* — Carlson, Gaskey & Olds, P.C.

(57) ABSTRACT

A turbomachine includes an annular flow path section between a plurality of radially extending stator vanes and a plurality of radially extending rotor blades. At least a first portion of the flow path section has a circumferentially varying outer periphery which includes a recess circumferentially alternating with axisymmetric surfaces.

15 Claims, 7 Drawing Sheets

(51) Int. Cl.
*F04D 29/68* (2006.01)
*F04D 29/54* (2006.01)
*F04D 27/02* (2006.01)

(56) References Cited

U.S. PATENT DOCUMENTS

| | | |
|---|---|---|
| 7,210,905 B2 | 5/2007 | Lapworth |
| 8,678,740 B2 | 3/2014 | Praisner et al. |
| 2005/0019152 A1 | 1/2005 | Seitz |
| 2007/0258818 A1 | 11/2007 | Allen-Bradley et al. |
| 2010/0232954 A1 | 9/2010 | Clemen |
| 2010/0329852 A1 | 12/2010 | Brignole et al. |
| 2012/0003085 A1 | 1/2012 | Agneray et al. |
| 2012/0201663 A1* | 8/2012 | Praisner .................. F01D 5/143 415/199.5 |

* cited by examiner

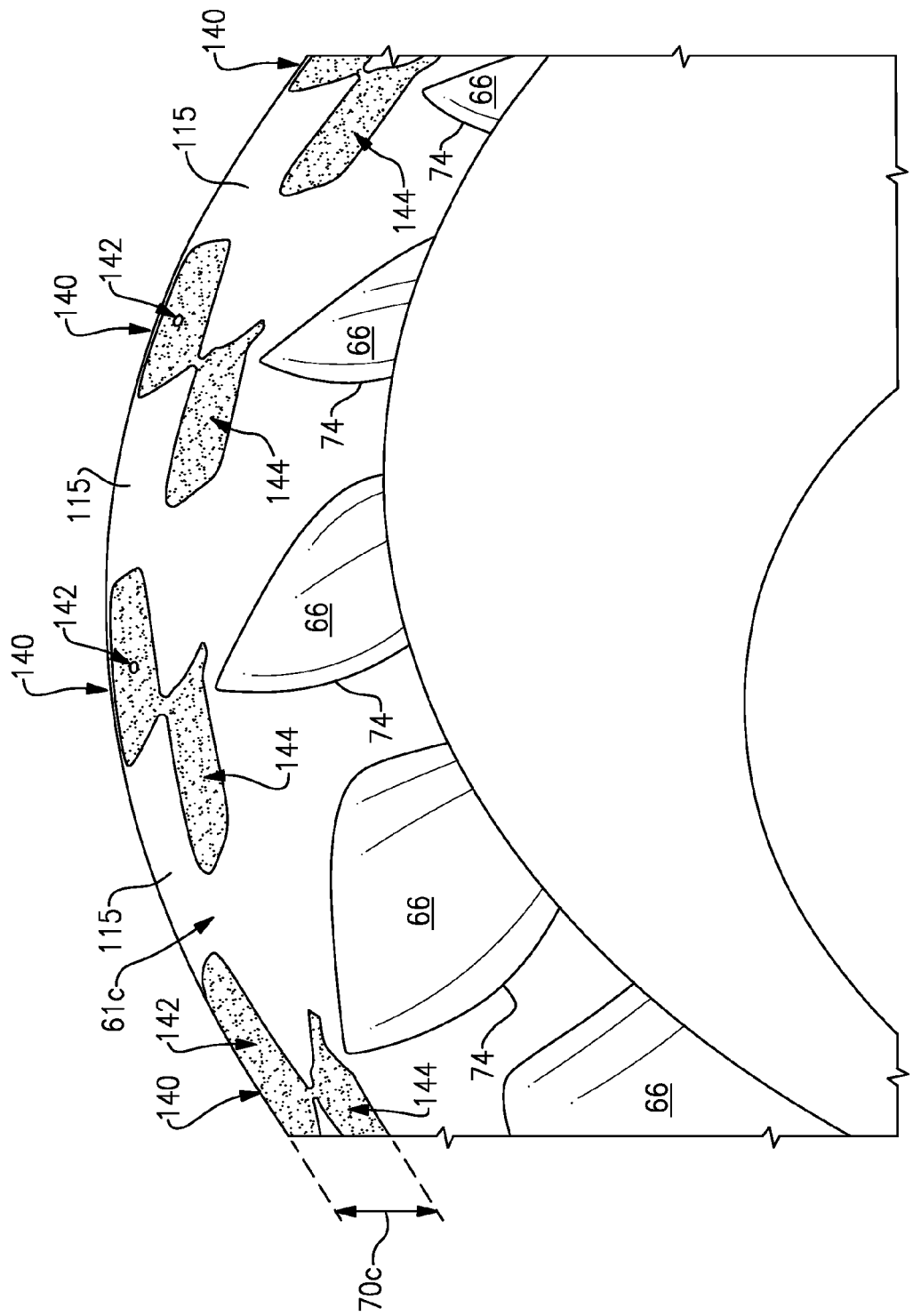

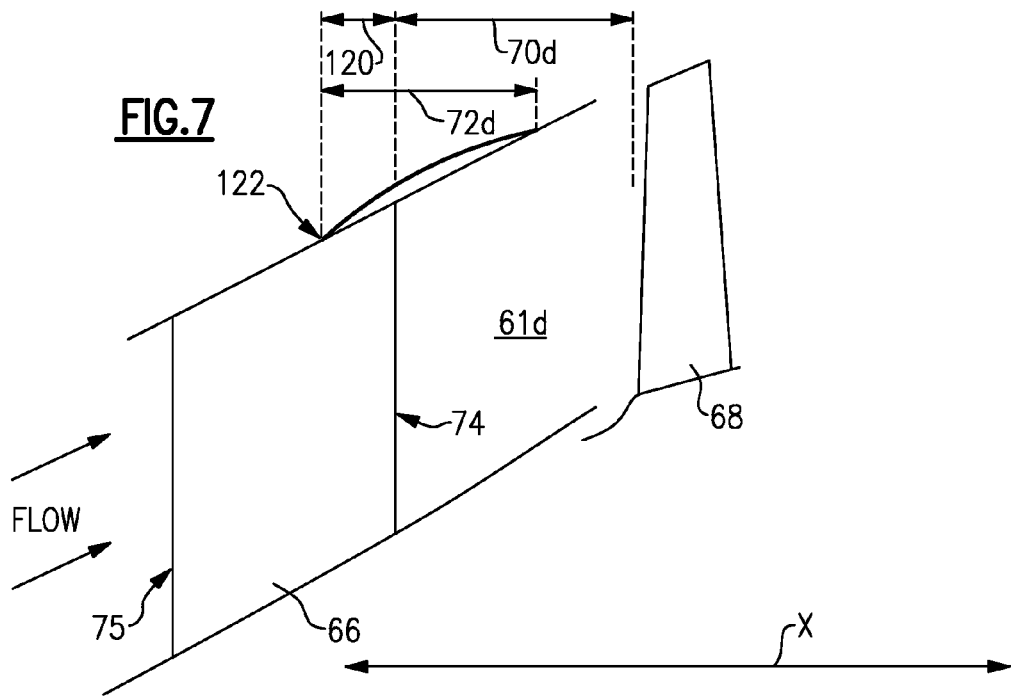
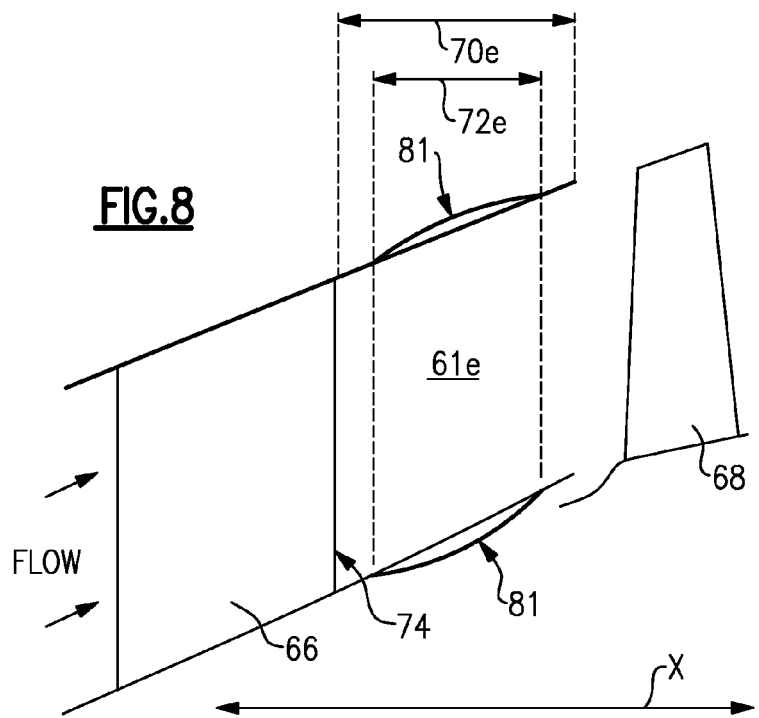

TURBOMACHINE FLOW PATH HAVING CIRCUMFERENTIALLY VARYING OUTER PERIPHERY

BACKGROUND

This disclosure relates to turbomachines, and more particularly to an annular flow path of a turbomachine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Gas turbine engines include flow paths with a plurality of airfoils, both non-rotating stator vanes and rotating rotor blades, typically arranged in an axially alternating configuration. Such flow paths are defined between radially-inward and radially-outward endwalls, or periphery, that guide air flow within the turbomachine. The interaction between the air flow progressing through such a flow path and the plurality of airfoils may result in the formation of a non-uniform pressure field within the flow path. Rotor blade airfoils that are moving through this non-uniform pressure field may experience the non-uniform pressure field in a time-varying manner which may result in the generation of time-varying stresses within the airfoil. The magnitude of these stresses may be of considerable concern if they compromise the structural integrity of the rotor blades due to material failure.

SUMMARY

In one exemplary embodiment, a turbomachine includes an annular flow path section between a plurality of radially extending stator vanes and a plurality of radially extending rotor blades. At least a first portion of the flow path section has a circumferentially varying outer periphery which includes a recess circumferentially alternating with axisymmetric surfaces.

In a further embodiment of the above, the annular flow path section corresponds to a platform wing of the turbomachine and extends between a trailing edge of the stator vanes and a leading edge of the rotor blades.

In a further embodiment of any of the above, the circumferentially varying outer periphery is defined by a circumferentially repeating pattern along the outer periphery. The pattern repeats at least once with each circumferential vane pitch.

In a further embodiment of any of the above, the outer periphery of the first portion defines a plurality recess sets. Each recess set includes two indentations that are axially and circumferentially offset from each other.

In a further embodiment of any of the above, the outer periphery of the first portion is optimized to reduce vibratory stresses on the plurality of radially extending rotor blades.

In a further embodiment of any of the above, the radially extending stator vanes are airfoil vanes of a gas turbine engine. The radially extending rotor blades are rotor blades of the gas turbine engine.

In a further embodiment of any of the above, the radially extending rotor blades correspond to a low pressure turbine of the gas turbine engine. The annular flow path extends from a high pressure turbine fore of the stator vanes around the plurality of stator vanes to the low pressure turbine.

In a further embodiment of any of the above, a ratio of recess to axisymmetric surface amplitude of the outer periphery of the first portion to an axial chord length of one of the plurality of radially extending stator vanes is greater than or equal to 0.005.

In a further embodiment of any of the above, the first portion of the flow path section also has a circumferentially varying inner periphery.

In a further embodiment of any of the above, a ratio of a recess to axisymmetric surface amplitude of the inner periphery of the first portion to an axial chord length of one of the plurality of radially extending stator vanes is greater than or equal to 0.005.

In a further embodiment of any of the above, a second portion of the flow path extends from the first portion beyond a trailing edge of the plurality of stator vanes to a location intermediate the trailing edge and a leading edge of the plurality of stator vanes. The second portion also has a circumferentially varying outer periphery. The circumferentially varying outer periphery of the first portion is continuous with the circumferentially varying outer periphery of the second portion.

In another exemplary embodiment, a method of reducing vibratory stress on a plurality of radially extending rotor blades includes defining an annular flow path section between a plurality of radially extending stator vanes and a plurality of radially extending rotor blades. A first portion of the flow path section is defined to have a circumferentially varying outer periphery including recesses circumferentially alternating with axisymmetric surfaces.

In a further embodiment of any of the above, the first portion of the annular flow path is defined such that a ratio of a recess to axisymmetric surface amplitude of the outer periphery of the first portion to an axial chord length of one of the plurality of radially extending stator vanes is greater than or equal to 0.005.

In a further embodiment of any of the above, the circumferentially varying outer periphery of the first portion is defined by a circumferentially repeating pattern along the outer periphery. The pattern repeats at least once with each circumferential vane pitch.

In a further embodiment of any of the above, the first portion of the flow path is defined such that the outer periphery of the first portion forms a plurality recess sets. Each recess set includes two indentations that are axially and circumferentially offset from each other.

In a further embodiment of any of the above, the first portion of the flow path section is defined to have a circumferentially varying inner periphery.

BRIEF DESCRIPTION OF THE DRAWINGS

The disclosure can be further understood by reference to the following detailed description when considered in connection with the accompanying drawings wherein:

FIG. 6b illustrates a topological view of an interior of the example flow path of FIG. 6a from a vantage point shown on the turbomachine centerline axis of FIG. 3 aft of a turbomachine stator vane looking upstream.

FIG. 7 schematically illustrates an example flow path having a circumferentially varying outer periphery that extends axially upstream of the trailing-edge of a stator vane.

FIG. 8 schematically illustrates an example flow path portion having a circumferentially varying outer periphery and a circumferentially varying inner periphery.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
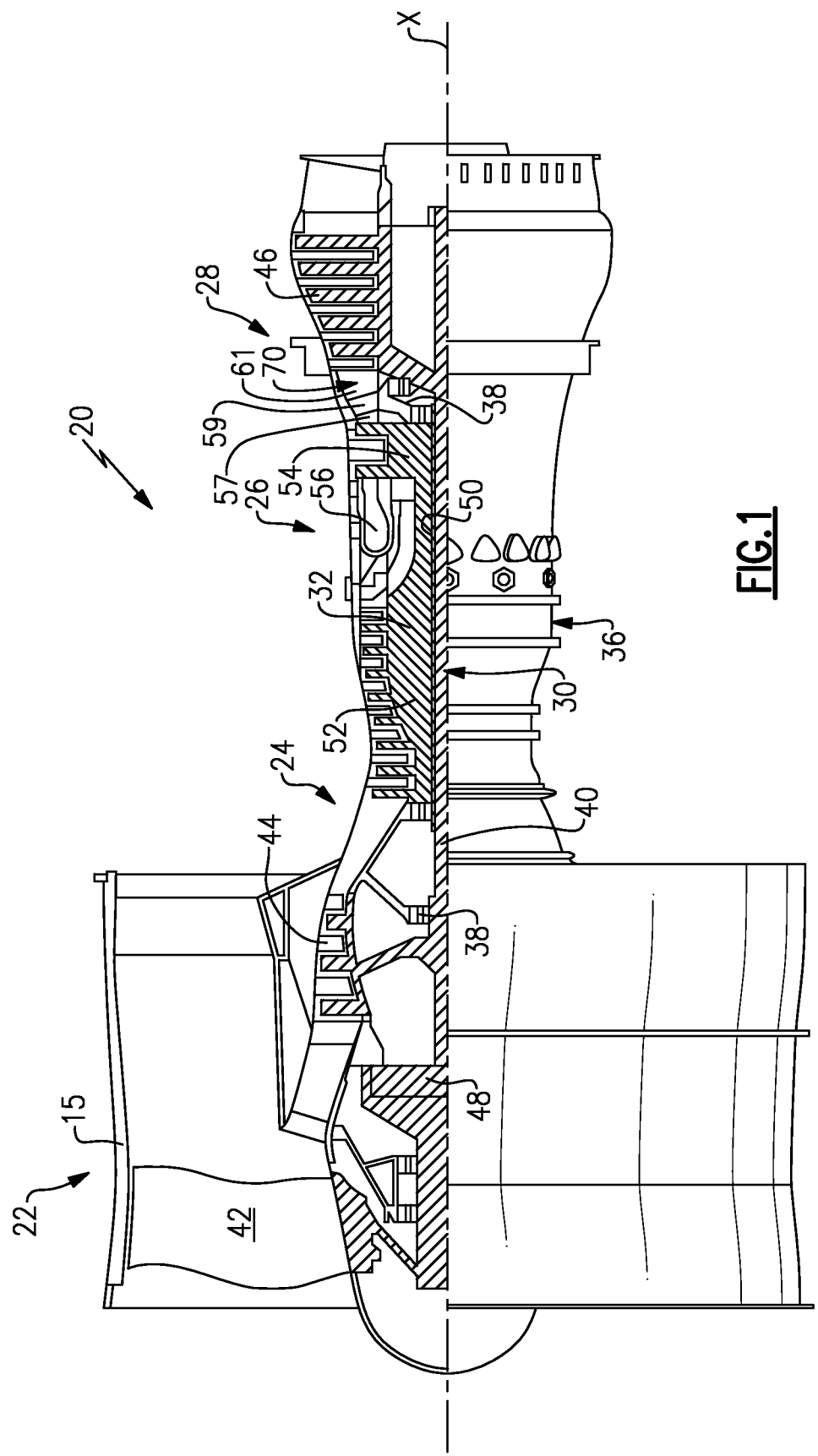
FIG. 1 is a schematic cross-section of a gas turbine engine having an annular flow path.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Core airflow is compressed by the low pressure compressor 44 then the high pressure compressor 52, mixed with the fuel in the combustor 56, then expanded over the high pressure turbine 54 and low pressure turbine 46 along annular flow path 61. The turbines 54, 46 rotationally drive the respective low speed spool 30 and high speed spool 32 in response to the expansion.

Figure 2:
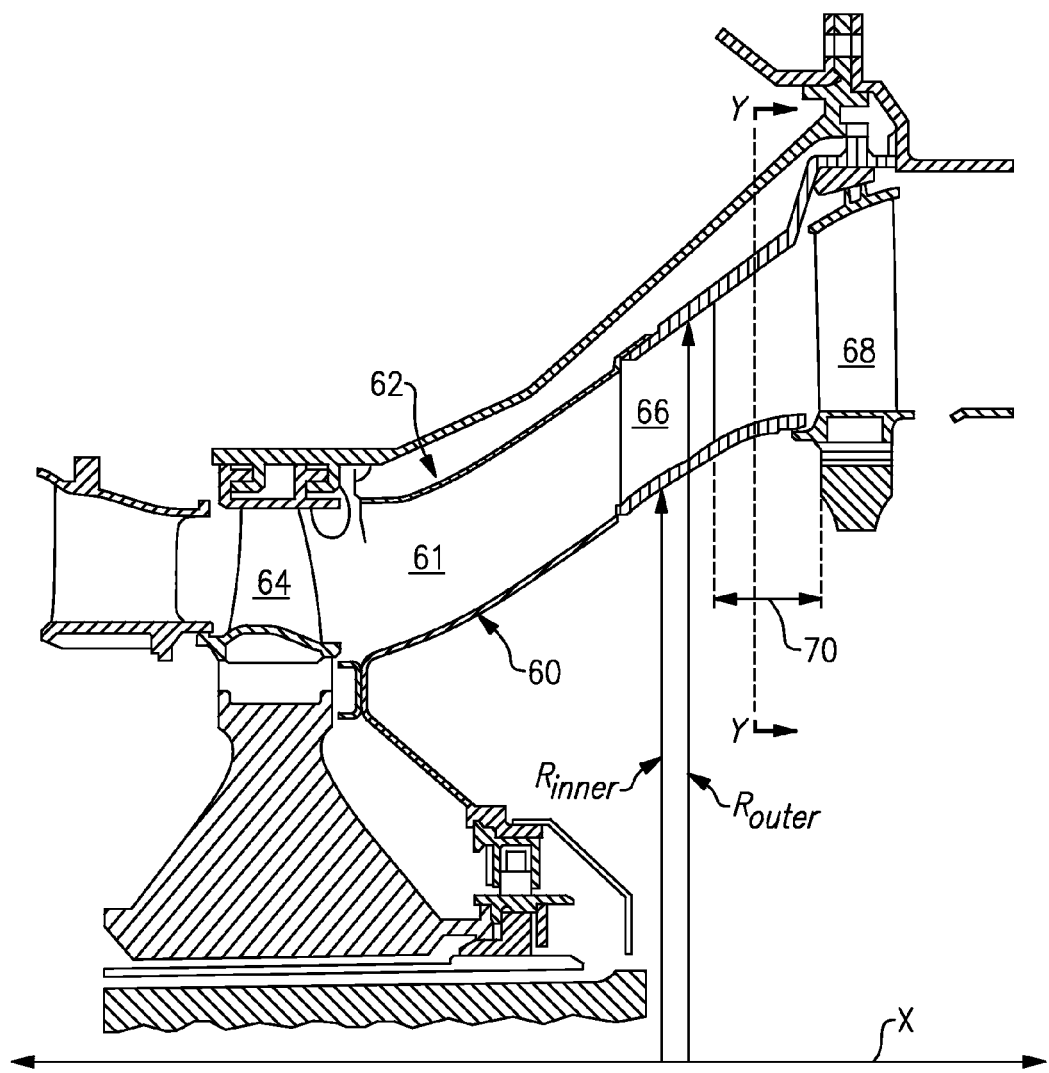
FIG. 2 is an enlarged schematic cross section of the gas turbine engine of FIG. 1.

With reference to FIG. 2, an inner wall 60 and an outer wall 62 at least partially define the annular flow path 61. The flow path 61 extends across a transition duct region of the engine 20, from rotor blades 64 (corresponding to high pressure turbine 54) through passages formed by a plurality of stator vanes 66 (corresponding to airfoils 59 of mid-turbine frame 57) to rotor blades 68 (corresponding to low pressure turbine 46). The rotor blades 68 rotate about the centerline axis X. Although only one stator vane 66 is shown, it is understood that the stator vane 66 is one of a plurality of radially extending stator vanes. Also, although only one rotor blade 68 is shown, it is understood that the rotor blade 68 is one of a plurality of radially extending rotor blades that rotates about the axis X. The annular flow path 57 has an outer radius $R_{outer}$ and an inner radius $R_{inner}$ with respect to the axis X. As will be described below with reference to FIGS. 3-9, at least a portion of a platform wing section 70 of the annular flow path 61 has a circumferentially varying outer periphery. It should be understood that this circumferentially varying outer periphery can be used along other portions of the annular flow path.

Figure 3:
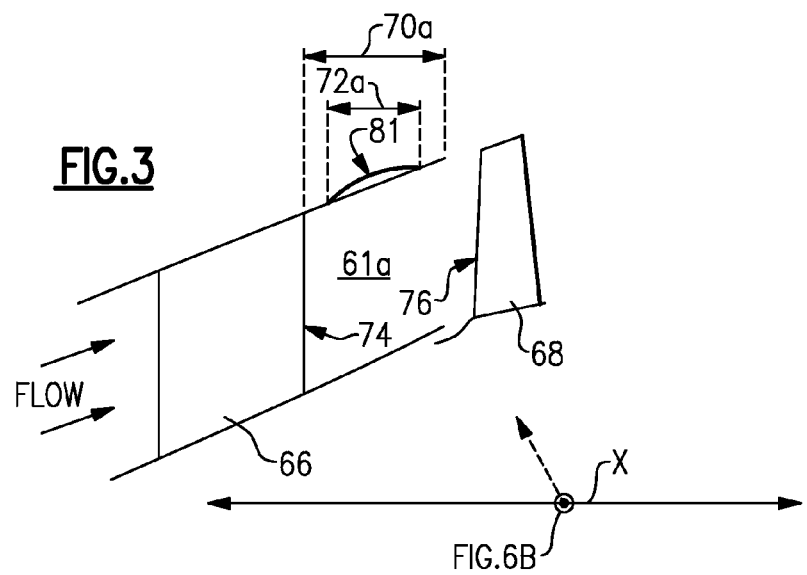
FIG. 3 schematically illustrates an example flow path having a circumferentially varying outer periphery, and having a single recess axially along a centerline axis of the turbomachine.

With reference to FIG. 3, in one non-limiting embodiment a platform wing section 70a of annular flow path 61a extends between a trailing edge 74 of stator vanes 66 and a leading edge 76 of rotor blades 68. A portion 72a of the platform wing section 70a has a circumferentially varying outer periphery featuring a series of alternating recesses 81 circumferentially around the portion 72a. In the non-limiting embodiment of FIG. 3, the circumferentially varying outer periphery of portion 72a includes one recess axially along the axis X such that the recess 81 does not axially overlap the adjacent vane 66 or blade 68.

Figure 4:
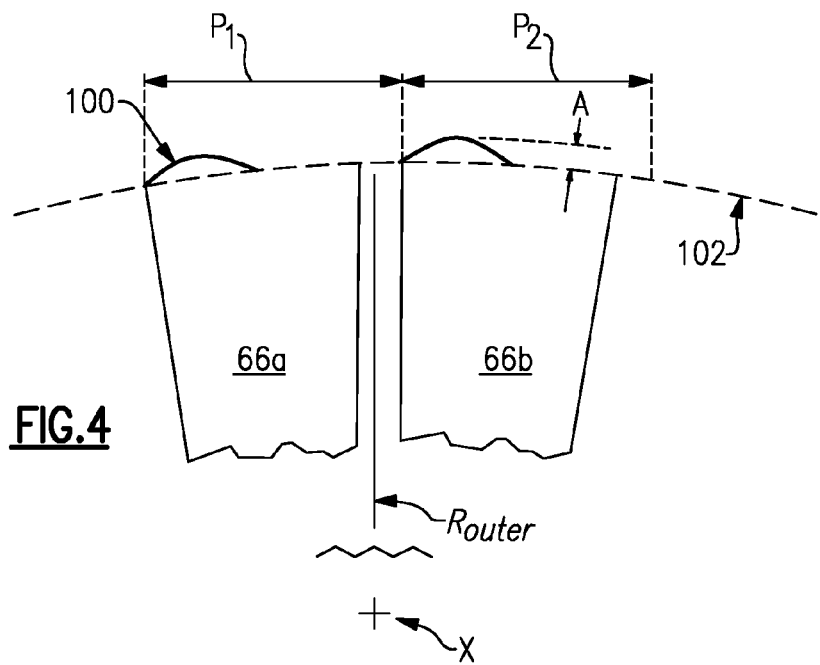
FIGS. 4 and 4a schematically illustrate perspective views of the flow path of FIG. 3 along line Y-Y of FIG. 2.
Figure 4A:
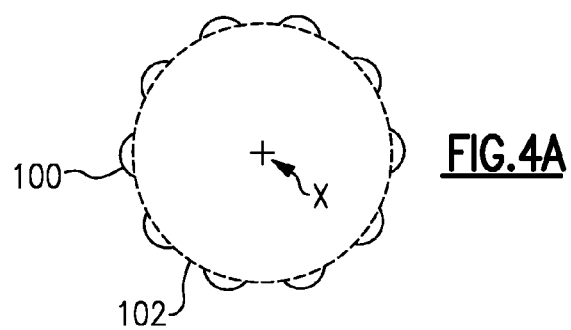

With reference to FIGS. 4 and 4a (which illustrate perspective views of the flow path 61a along line Y-Y of FIG. 2), in one non-limiting embodiment the outer periphery of the portion 72a may be defined by a circumferentially repeating pattern 100 which is non-axisymmetric with respect to turbomachine axis X, unlike the circumferentially adjacent conventional outer periphery 102 that is axisymmetric with respect to the axis X. The pattern 100 does not include structure that is proud of the conventional outer periphery 102—only recessed—to provide recesses 81 that circumferentially alternate with axisymmetric surfaces. The surface geometry may be smoothed at the transition between these features.

In the non-limiting embodiment of FIG. 4, the pattern 100 is defined to repeat once with each circumferential vane pitch $P_1$, $P_2$, etc. of vanes 66a, 66b. If the vanes 66a, 66b are constructed separately and are later assembled to abut each other, the pattern 100 that repeats with each vane pitch $P_1$, $P_2$, etc. avoids abrupt changes in the outer periphery of the flow path 57a. Of course, this is only an example pattern, and it is understood that other patterns would be possible. For example, the pattern 100 may instead repeat with multiples of vanes (e.g., repeat every 2 vanes, repeat every 3 vanes, etc.).

Figure 5:
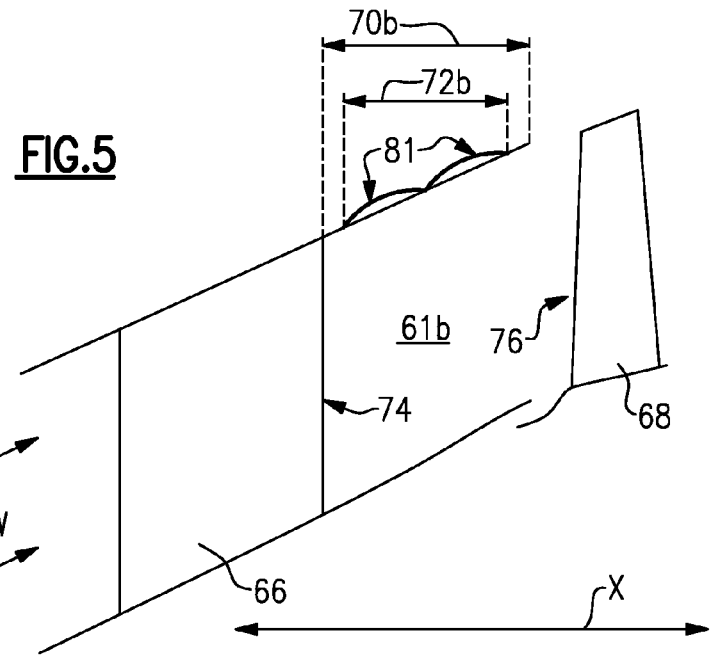
FIG. 5 schematically illustrates an example flow path having a circumferentially varying outer periphery, and having more than a single recess axially along the centerline axis of the turbomachine.

With reference to FIG. 5, in one non-limiting embodiment a portion 72b of platform wing section 70b of annular flow path 61b having a circumferentially varying outer periphery may include a multiple of axially offset recesses 81 along axis X. In one example the outer periphery may be defined to have recess sets that are axially and circumferentially offset from each other.

Figure 6A:
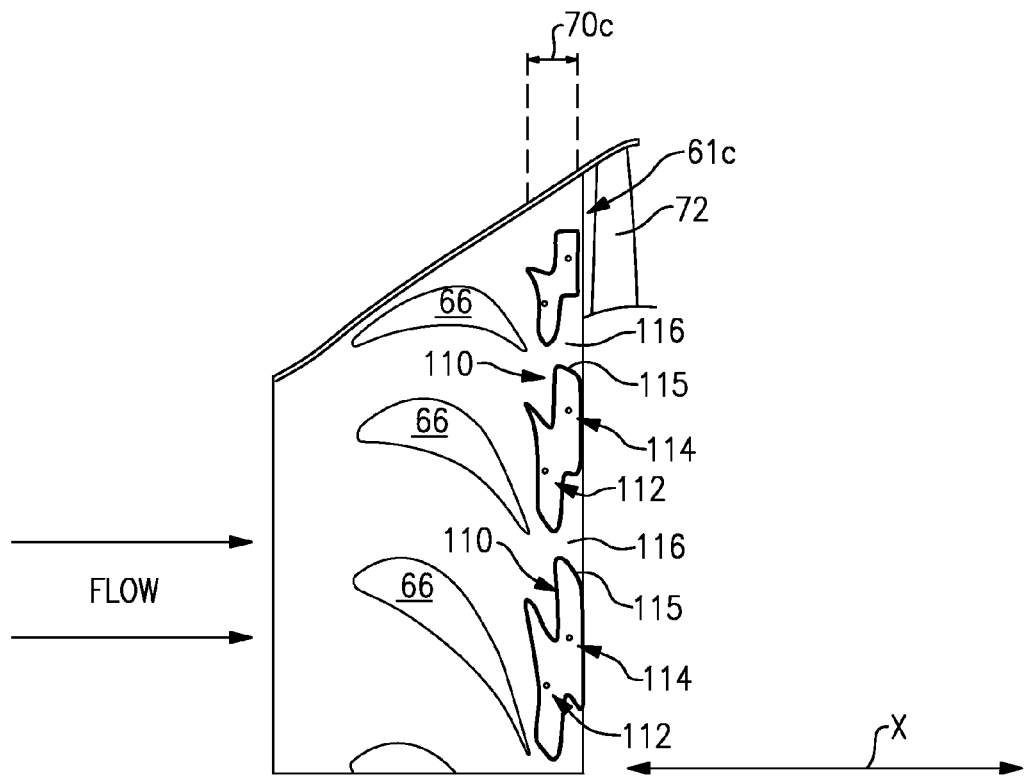
FIG. 6a illustrates a topological view of another example flow path having a circumferentially varying outer periphery, and having more than a single recess axially along the centerline axis of the turbomachine.

Referring to FIG. 6a, in one non-limiting embodiment, a topological view is shown of an exterior of annular flow path 61a having a circumferentially varying outer periphery featuring a plurality of recess sets 110. Each set 110 of recesses includes two indentations 112, 114 that are axially offset from each other and are circumferentially offset and out of phase with each other. The recess sets 110 are part of topologically raised areas, shown by outer boundary, which is axisymmetric surface 115. An area 116 between the sets 110 of indentations 112, 114 may include lowered areas having lowered peaks (see, e.g., FIG. 5).

FIG. 6b shows another non-limiting embodiment of a topological view of an interior of the flow path 61c from the perspective shown in FIG. 3 on the turbomachine centerline axis X aft of the stator vane 66, looking upstream. As shown, a plurality of lowered recess sets 140 is located between the topologically axisymmetric surface 115 of FIG. 6a. The lowered recess sets 140 each include two indentations 142, 144 that are circumferentially offset and out of phase with each other. In one example the topologically lowered areas correspond to the area 116 of FIG. 6a.

With reference to FIG. 7, in one non-limiting embodiment, a flow path section 72d of a platform wing section 70d having a circumferentially varying outer periphery may extend beyond the trailing edge 74 of the stator vane 66 to include a flow path portion 120 that terminates at a location 122 forward of the trailing edge 74. In the non-limiting embodiment of FIG. 7, the location 122 is located at an intermediate location between the trailing edge 74 and leading edge 75 of the stator vane 66.

With reference to FIG. 8, in one non-limiting embodiment, a flow path portion 72e of platform wing section 70e of annular flow path 61e may include a circumferentially varying outer periphery and a circumferentially varying inner periphery, such that both the inner and outer periphery of the flow path portion 72e vary circumferentially about the annular flow path 61e. Although the inner periphery of flow path portion 72e is shown as only including a single peak recess 81 axially along axis X, it is understood that the inner periphery could include multiple recesses such as the outer periphery of portion 72b of FIG. 5.

Figure 9:
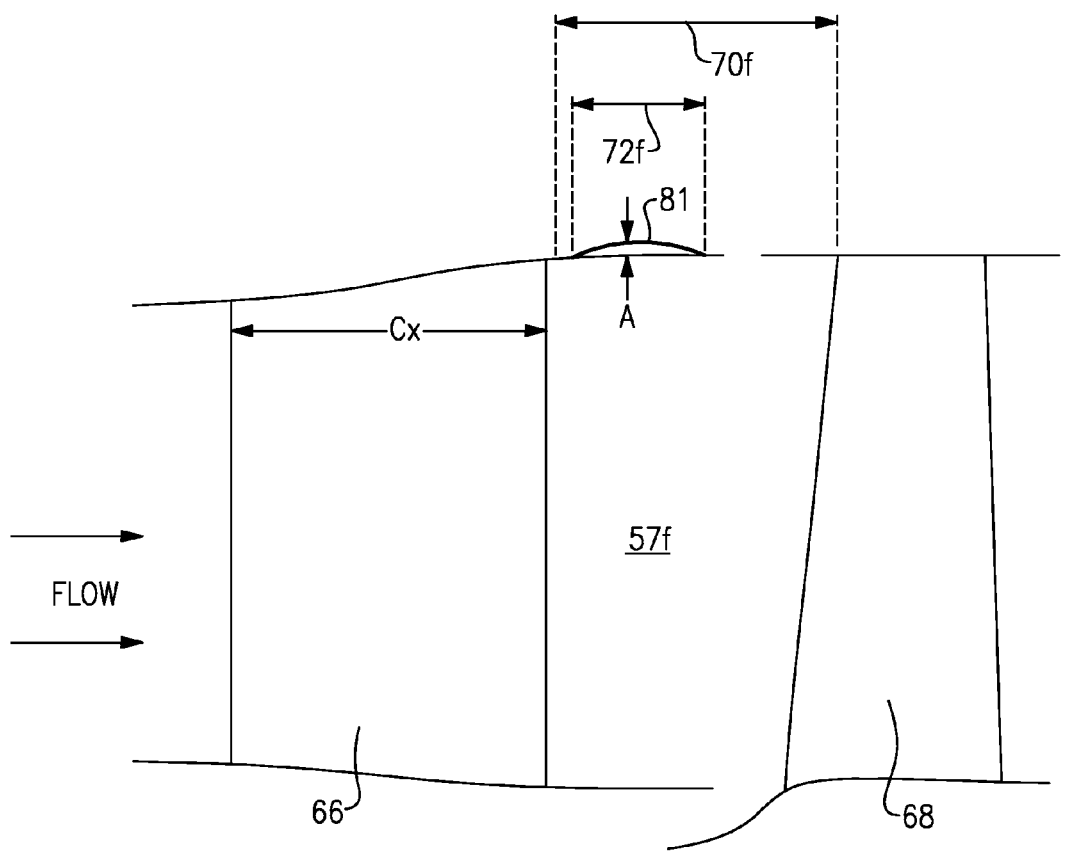
FIG. 9 schematically illustrates a ratio of an outer periphery recess amplitude to a stator vane axial chord length.

With reference to FIG. 9, the magnitude of the annular flow path outer periphery circumferential variations may be quantified in relation to stator vane axial chord length. As shown in FIG. 9, portion 72f of annular flow path 57f has a recess to axisymmetric surface amplitude of A. In the non-limiting embodiment of FIG. 9, a ratio of A to an axial chord length $C_x$ of the stator vane 66 is greater than or equal to 0.005. Of course, this is only an example, and other ratios would be possible. In one example this same ratio applies to the circumferentially varying inner periphery (FIG. 8).

The circumferentially varying outer periphery (and the optional circumferentially varying inner periphery) of the flow path portion 72 reduces vibratory stresses on the rotor blades 68 while the rotor blades 68 are rotating. In one example the circumferentially varying periphery can achieve a vibratory stress reduction on the order of 10-20% for the rotor blades 68. Computer simulations may optionally be performed to optimize the flow path 72 in order to determine optimal flow path dimensions.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A turbomachine, comprising:
    an annular flow path section between a plurality of radially extending stator vanes and a plurality of radially extending rotor blades, at least a first portion of the flow path section having a circumferentially varying outer periphery comprising both recesses and axisymmetric surfaces, wherein the outer periphery includes a repeating pattern of the recesses circumferentially alternating with the axisymmetric surfaces, the outer periphery not including any structure that is proud of the axisymmetric surfaces.

2. The turbomachine as recited in claim 1, wherein the annular flow path section corresponds to a platform wing of the turbomachine and extends between a trailing edge of the stator vanes and a leading edge of the rotor blades.

3. The turbomachine as recited in claim 1, wherein the circumferentially varying outer periphery is defined by a circumferentially repeating pattern along the outer periphery, the pattern repeating at least once with each circumferential vane pitch.

4. The turbomachine as recited in claim 1, wherein the outer periphery of the first portion defines a plurality recess sets, each recess set including two indentations that are axially and circumferentially offset from each other.

5. The turbomachine as recited in claim 1, wherein the radially extending stator vanes are airfoil vanes of a gas turbine engine, and the radially extending rotor blades are rotor blades of the gas turbine engine.

6. The turbomachine as recited in claim 5, wherein the radially extending rotor blades correspond to a low pressure turbine of the gas turbine engine, and wherein the annular flow path extends from a high pressure turbine fore of the stator vanes around the plurality of stator vanes to the low pressure turbine.

7. The turbomachine as recited in claim 1, wherein a ratio of recess to axisymmetric surface amplitude of the outer periphery of the first portion to an axial chord length of one of the plurality of radially extending stator vanes is greater than or equal to 0.005.

8. The turbomachine as recited in claim 1, wherein the first portion of the flow path section also has a circumferentially varying inner periphery.

9. The turbomachine as recited in claim 8, wherein a ratio of a recess to axisymmetric surface amplitude of the inner periphery of the first portion to an axial chord length of one of the plurality of radially extending stator vanes is greater than or equal to 0.005.

10. The turbomachine as recited in claim 1, wherein a second portion of the flow path extends from the first portion beyond a trailing edge of the plurality of stator vanes to a location intermediate the trailing edge and a leading edge of the plurality of stator vanes, the second portion also having a circumferentially varying outer periphery, the circumferentially varying outer periphery of the first portion being continuous with the circumferentially varying outer periphery of the second portion.

11. A method of reducing vibratory stress on a plurality of radially extending rotor blades, comprising:
    defining an annular flow path section between a plurality of radially extending stator vanes and a plurality of radially extending rotor blades; and
    defining a first portion of the flow path section to have a circumferentially varying outer periphery comprising bother recesses and axisymmetric surfaces, wherein the outer periphery includes a repeating pattern of the recesses circumferentially alternating with the axisymmetric surfaces, the outer periphery not including any structure that is proud of the axisymmetric surfaces.

12. The method of claim 11, wherein the first portion of the annular flow path is defined such that a ratio of a recess to axisymmetric surface amplitude of the outer periphery of the first portion to an axial chord length of one of the plurality of radially extending stator vanes is greater than or equal to 0.005.

13. The method of claim 12, wherein the circumferentially varying outer periphery of the first portion is defined by a circumferentially repeating pattern along the outer periphery, the pattern repeating at least once with each circumferential vane pitch.

14. The method of claim 11, wherein the first portion of the flow path is defined such that the outer periphery of the first portion forms a plurality recess sets, each recess set including two indentations that are axially and circumferentially offset from each other.

15. The method of claim 11, including:
    defining the first portion of the flow path section to have a circumferentially varying inner periphery.

* * * * *